United States Patent
Papajewski

[11] Patent Number: 6,152,660
[45] Date of Patent: Nov. 28, 2000

[54] DRILLING TOOL FOR BORES IN SOLID MATERIAL

[76] Inventor: Jörg Papajewski, Wilhelm-Dodel-Gasse 14, D-72458 Albstadt, Germany

[21] Appl. No.: 09/218,810

[22] Filed: Dec. 22, 1998

[30] Foreign Application Priority Data

Dec. 22, 1997 [DE] Germany ............ 197 57 242

[51] Int. Cl.⁷ .......................... B23B 27/14; B23B 51/00
[52] U.S. Cl. ............................................. 408/144; 407/118
[58] Field of Search ........................ 408/144, 145, 408/224, 223, 713; 407/118, 119

[56] References Cited

U.S. PATENT DOCUMENTS

| | | | |
|---|---|---|---|
| 4,704,055 | 11/1987 | Guhring | 408/59 |
| 4,818,153 | 4/1989 | Strandell et al. | 407/113 |
| 5,154,550 | 10/1992 | Isobe et al. | 408/144 |
| 5,186,739 | 2/1993 | Isobe et al. | 75/238 |
| 5,228,812 | 7/1993 | Noguchi et al. | 408/144 |
| 5,580,196 | 12/1996 | Thompson | 408/145 |
| 5,599,145 | 2/1997 | Reinauer et al. | 408/233 |
| 5,641,251 | 6/1997 | Leins et al. | 408/144 |
| 5,716,170 | 2/1998 | Kammermeier et al. | 408/145 |
| 5,788,431 | 8/1998 | Basteck | 408/229 |
| 5,853,268 | 12/1998 | Simpson | 407/119 |
| 5,855,458 | 1/1999 | Reynolds et al. | 407/54 |
| 5,865,571 | 2/1999 | Tankala et al. | 408/1 R |
| 5,882,152 | 3/1999 | Janitzki | 408/144 |
| 5,909,985 | 6/1999 | Shiga et al. | 408/1 R |

FOREIGN PATENT DOCUMENTS

| | | | |
|---|---|---|---|
| 405092304A | 4/1993 | Japan | 408/144 |
| 2085769A | 5/1982 | United Kingdom | 408/144 |

*Primary Examiner*—A. L. Wellington
*Assistant Examiner*—Adrian M. Wilson

[57] ABSTRACT

A drilling tool for boreholes in solid material, with a drill shaft with at least one cutter arranged at the end of the drilling tool and at least one recess which extends in the axial direction from the end of the drill tool, to conduct chips from the borehole. At least one of the cutters is made of a coated cermet cutting material.

13 Claims, 1 Drawing Sheet

DRILLING TOOL FOR BORES IN SOLID MATERIAL

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

The invention relates to a drilling tool for bores in solid material and, more particularly, to a drilling tool with a drill shaft and cutting devices at the end of the drilling tool.

Drilling tools are known which have a drill shaft with which the drilling tool can be clamped in a suitable seating, and adjoining which in the axial direction is a working region of the tool. In the region of an end face of the tool, the following varieties of cutting devices are fastened, either releasably, e.g. screwed or clamped, or unreleasably, e.g., adhered or soldered in suitable seatings:

- a cutter which is substantially symmetrical with respect to the drill axis,
- at least one cutter which is arranged so that the cutting edge extends from the periphery of the diameter to be produced to at least the center of the diameter to be produced or up to a cross cutter.
- two or more cutters, which can have different geometries, and which are arranged such that each cutting edge covers a given region of the diameter to be produced.
- one of the previously stated arrangements, in which the cutting device is embodied as an interchangeable cutter head, in which all of the cutter geometry is machined from one cutting material blank.
- one of the previously stated arrangements, in which the cutting device is embodied as an interchangeable cutter head, in which only the immediate cutting region consists of the desired cutting material, e.g., brazed-in cutters.

When the drilling tool has at least two cutters, then the cutters are distributed radially at the periphery of the tool, and the angular peripheral distances must not be equally large. If the drilling tool has at least three cutters, then a respective two or more cutters can be located in the same radial position, but at different diameter positions.

Adjoined to the cutter receiving region in all the stated variants is an axially directed tool shank having at least one recess which serves to transport out of the bore the chips which arise during machining.

These described drilling devices are produced from a cemented carbide made by powder metallurgy. In chip-producing manufacture, however, materials are understood by "cemented carbide" whose hard phase substantially consists of tungsten carbide (WC), but also of other carbide formers. The cemented carbide consisting substantially of tungsten carbide can be uncoated or can be additionally coated with a hard material.

The productivity of drilling processes is substantially determined by the features of cutting speed and forward feed, wear behavior and machining quality, and these furthermore depend directly on the properties of the cutting materials used.

SUMMARY OF THE INVENTION

The invention has as its object to markedly improve drilling machining in solid material.

This object is attained by a drilling tool with at least one cutter of a coated cermet cutting material, preferably with a coating of hard material.

The cutting material cermet has a high elevated temperature hardness and a high oxidation resistance in comparison with cemented carbide. These properties make possible markedly higher machining speeds than with cemented carbide, in fine machining, for example, boring, reaming, fine turning, finishing milling or the like. In reaming, for example, cutting speeds which are higher by a factor of about 4 are possible with cermet as the cutting material, with a simultaneous improvement of the machining quality and wear resistance. Of course, cermet also has a low bending strength and fracture toughness in comparison with hard metal. These features do not have a great effect in the fine machining of boreholes. The typical chip removal cross sections with a cutting depth of about 0.1–0.3 mm are comparatively small here, and the resulting chip removal forces are thus small. For drilling in solid material (rough machining), on the other hand, the chip removal cross sections are markedly greater. Thus the chip removal width is about 5 mm, for example, for a solid drill with a diameter of 20 mm with two radially arranged indexable inserts. Correspondingly large chip removal forces result from this very large chip removal cross section, and have to be taken up by the cutter. Cermet does not provide the necessary bending strength and fracture toughness for this.

Coating of the cermet results in a portion of the mechanical load on the cermet being taken up by the coating. The load on the cermet is thereby substantially reduced. However, because of the small coating thickness, the advantages of the cermet are still in effect. Since cermet is a heat insulator in comparison with hard metal, a larger portion of the chip formation heat remains in the chip which flies off. The cutter thus becomes less hot. Thus markedly higher chip removal temperatures can be attained in connection with the higher elevated temperature hardness of the cermet, and this is tantamount to higher machining speeds.

A coating thickness of less than 50 $\mu$m is advantageously provided for the coating of the cutter. If the drilling tool is provided with at least two spatially separated mountings for mounting the cutter device, a mixed mounting can also be effected. This means that only a portion of the cutter consists of a coated cermet cutting material.

In an advantageous embodiment of the invention, it is provided that the coating is a layer of hard material, which has at least titanium and nitrogen as components. Furthermore, the coatings can contain components such as, for example, chromium, boron or zirconium and nitrogen, e.g., chromium nitride or zirconium nitride.

According to a further advantageous embodiment of the invention, it is provided that the cermet cutter plate, before coating, is mechanically machined on its flank, e.g., by grinding and/or irradiating, and on its tool face either remains unprocessed or is mechanically processed, e.g., by brushing and/or irradiation. The mechanically processed flanks and tool faces enable the frictional processes and hence the heat development on chip formation to be reduced, and hence increase the possible machining data. In addition, possible failure points in the surface, such as cracks, remaining sinter residues, and particles which are adhering relatively loosely, can be removed by the mechanical processing.

Alternatively, it can likewise be provided that the cermet cutter plate produced by sintering technology can be precisely formed such that a coating of the cermet cutter plate can be effected even without mechanical pretreatment, e.g. by grinding, of the flank. A mechanical pretreatment of the tool face is also possible here.

An increase in the stability under load of the cermet cutter plate can be attained by the mechanical processing of the flank and of the tool face, since a better coating bond and thus a better coating adhesion can be set by the smoothed surface. The quality of the smoothed surfaces can advantageously be set by the use data of the respective process which is used, for example, grinding means, grinding speed, feed motion, duration of feed or smoothing, smoothing speed and smoothing material.

Furthermore it is advantageously provided that the coated cermet cutter plate is mechanically after-treated, e.g., by brushing, irradiation, or polishing. The surface quality of the coated flank and chip can be further improved by this after-treatment, and the cutting data for machining are further improved.

According to a further advantageous embodiment of the invention, the coatings can be effected both as a monolayer coating and as a multilayer coating.

According to a further advantageous embodiment of the invention, it is provided that the coatings can be deposited on the cermet cutting material by either CVD or PVD processes and their variants.

In a further advantageous embodiment of the invention, it is provided that the uncoated cermet cutter plate is thermally and/or chemically pretreated for better coating adhesion, and/or that the coated cermet cutter plate is thermally and/or chemically after-treated. Furthermore, the cermet cutter plate after the coating can also have its surface mechanically after-treated, e.g., by brushing and polishing.

Advantageously the cutting edge of the cermet cutter plate, which is formed by the tool face and by the flank, can furthermore be provided with a radius smaller than about 50 $\mu$m (e.g., by brushing), the precision of the radius being predetermined by the process used. An increase in the stability of the cutting edge is attained by this rounding of the edge.

BRIEF DESCRIPTION OF THE DRAWINGS

A preferred embodiment is shown in the following drawings, in which.

DETAILED DESCRIPTION OF PREFERRED EMBODIMENTS

Figure 1:
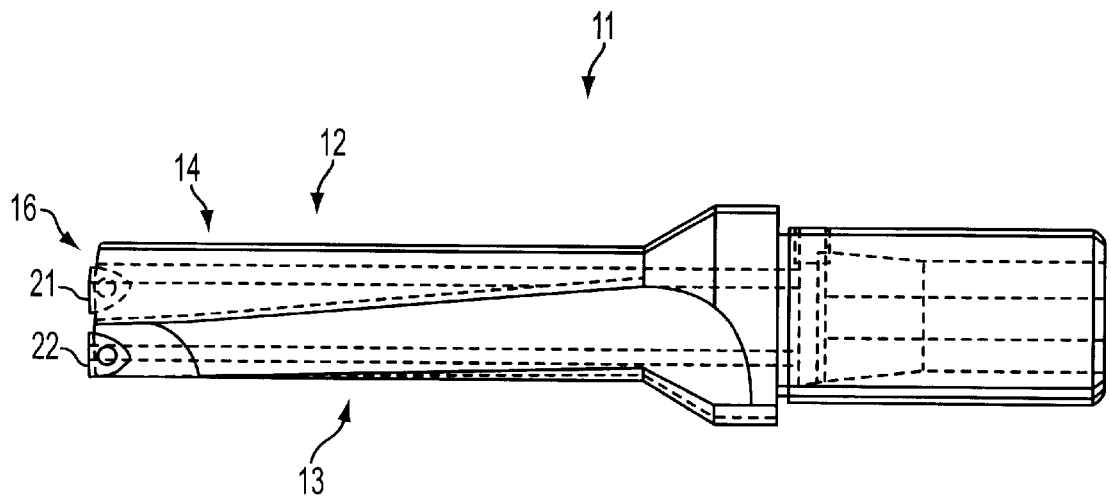
FIG. 1 shows a schematic side view of a drilling tool for bores in solid material.

FIG. 1 shows a side view of a drilling tool 11. A drill shaft 12 has two axially-extending recesses 13, 14 which are mutually diametrically opposite and which serve for the removal of drill chips. indexable inserts 21, 22 are provided in respective seatings at the end 16 of the drilling tool.

This drilling tool shown in FIG. 1 is only by way of example. There can be provided as a drilling tool each further alternative in which several indexable inserts are used, or else individual cutters are brazed to, or integrally connected with, the drill.

Figure 2:
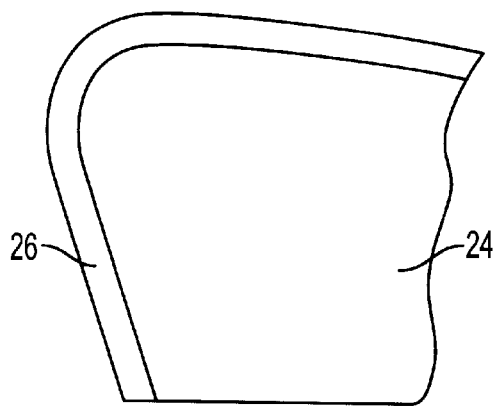
FIG. 2 shows a greatly enlarged cross section of a cutter.

FIG. 2 shows a greatly enlarged cross section of a cutter in greatly simplified form. A cutter base body 24 has a coating 26 which, for example, comprises less than 50 $\mu$m. The coating 26 comprises at least the components zirconium, boron or chromium and nitrogen. The coating 26 can be constituted as a monolayer or a multilayer. The coating 26 is provided according to FIG. 2, by way of example, as a monolayer. Cermet is provided as the material for the cutter base body 24. This material, in combination with the coating 26 according to the invention, advantageously has a high wear resistance, which leads to an improvement of the machining quality and an increase of the surface quality in bores.

I claim:

1. A drilling tool for boreholes in solid material, comprising:
   a drill shaft,
   at least one cutter arranged at the end of the drilling tool, and
   at least one recess which extends in an axial direction from said end of said drilling tool to conduct chips from the boreholes,
   in which said at least one cutter is comprised of a coated cermet cutting material and in which said cutter has a flank and a tool face, with a radius of less than 50 $\mu$m between said flank and said tool face.

2. The drilling tool according to claim 1, in which the coating of the coated cermet cutting material contains at least one of titanium and nitrogen.

3. The drilling tool according to claim 1, in which the coating of the coated cermet cutting material contains nitrogen and one of zirconium, boron, or chromium.

4. The drilling tool according to claim 1, in which said cutter is a sintered cutter plate with an unprocessed flank, an unprocessed tool face.

5. The drilling tool according to claim 1, in which said cutter is a sintered plate with a pre-coated, processed flank.

6. The drilling tool according to claim 1, in which said cutter is a sintered plate with a post-coated, processed flank.

7. The drilling tool according to claim 1, in which said cutter is a sintered plate with a pre-coated, processed tool face.

8. The drilling tool according to claim 1, in which said cutter is a sintered plate with a post-coated, processed tool face.

9. The drilling tool according to claim 1, in which the coating of said coated cermet cutting material comprises a layer of hard material.

10. The drilling tool according to claim 1, in which said layer of hard material has a layer thickness of less than 50 $\mu$m.

11. The drilling tool according to claim 1, in which the coating of said coated cutting material is formed as one of a monolayer or multilayer coating.

12. The drilling tool according to claim 1, in which said coating is a cermet coating.

13. A method of producing boreholes in solid material comprising using cutters comprised of coated cermet cutting material for a drilling tool with a drill shaft, with at least one said cutter arranged at the end of the drilling tool and at least one chip-conducting axial recess, providing said cutter with a flank and a tool face, with a radius of less than 50 $\mu$m between said flank and said tool face.

* * * * *